United States Patent [19]

Ikejima

[11] Patent Number: 4,681,191
[45] Date of Patent: Jul. 21, 1987

[54] SPEED CONTROL APPARATUS FOR ELEVATOR

[75] Inventor: Hiroyuki Ikejima, Inazawa, Japan

[73] Assignee: Mitsubishi Denki Kabushiki Kaisha, Japan

[21] Appl. No.: 733,472

[22] Filed: May 13, 1985

[30] Foreign Application Priority Data

May 17, 1984 [JP] Japan .................................. 59-99495

[51] Int. Cl.⁴ .............................................. B66B 1/30
[52] U.S. Cl. .................................................. 187/119
[58] Field of Search ................... 187/29; 318/767, 778, 318/798–802

[56] References Cited

U.S. PATENT DOCUMENTS 4,422,030 12/1983 McAllise .......................... 318/778 X
4,465,961 8/1984 Landino ........................... 318/802 X
4,479,565 10/1984 Nomura .............................. 187/29 R
4,516,664 5/1985 Anzai et al. ........................ 187/29 R

FOREIGN PATENT DOCUMENTS 56-52371 5/1981 Japan .
57-46695 3/1982 Japan .

Primary Examiner—William M. Shoop, Jr.
Assistant Examiner—W. E. Duncanson, Jr.
Attorney, Agent, or Firm—Leydig, Voit & Mayer

[57] ABSTRACT

The present invention relates to a speed control apparatus for an elevator wherein direct current is inverted into alternating current of variable voltage and variable frequency by a current-control type inverter and wherein an induction motor is driven by the inverted A.C. power so as to operate a cage, the speed control apparatus comprising control means to intensify a field of the induction motor beforehand at the time of start of the elevator and to reduce it down to a predetermined value after the start.

9 Claims, 5 Drawing Figures

SPEED CONTROL APPARATUS FOR ELEVATOR

BACKGROUND OF THE INVENTION

The present invention relates to a speed control apparatus for an elevator which is driven by a current control type inverter, and more particularly to attaining an improved ride at the time of the start of elevator.

In recent years, an A.C. variable-speed control in which a frequency converter is combined with a stout an inexpensive A.C. motor has been applied to elevators. Especially for elevators operating in a low speed region in which the primary voltage control of an induction motor has hitherto been performed, the A.C. variable-speed control has attracted notice from the viewpoint of energy conservation.

In order to achieve a control performance equal or superior to that of a D.C. motor by the use of the aforementioned control system, the A.C. motor needs, likewise to a D.C. motor, to have its primary current controlled separately and independently as to the component of the current contributive to a field (field component current $i_d$) and the component orthogonal thereto and contributive to a torque (torque component current $i_q$).

A conventional speed control system will be described with reference to FIGS. 4 and 5. In the figures, numeral 1 designates a speed command generator which generates a speed command signal $\omega_{rR}$. Numeral 2 designates a control device receiving the speed command signal $\omega_{rR}$ and a speed detection signal $\omega_r$ produced by a speed detector 12 connected an induction motor 11 to determine primary current commands $i_{uR}$, $i_{vR}$ and $i_{wR}$ for the motor 11. As shown in FIG. 4, the control device 2 comprises an adder 21 which evaluates the deviation between the speed command signal $\omega_{rR}$ and the speed detection signal $\omega_r$, a speed calculating circuit 22 which calculates a torque command $T_R$ on the basis of the deviation signal, and a primary current command calculating circuit 23 which calculates the primary current commands $i_{rR}$, $i_{vR}$ and $i_{wR}$ on the basis of the torque command $T_R$ and the speed detection signal $\omega_r$.

Numerals 3-5 indicate adders which evaluate the deviations between the primary current commands $i_{uR}$, $i_{vR}$ and $i_{wR}$ and the actual currents $i_u$, $i_v$ and $i_w$ of the motor detected by current detectors 8-10, respectively. The deviation signals are applied to a current control circuit 6, which controls a frequency converter 7 on the basis of the deviation signals so that the primary currents $i_u$, $i_v$ and $i_w$ may agree with the respective current commands $i_{uR}$, $i_{vR}$ and $i_{wR}$. Thus, output currents from the frequency converter 7 are controlled to feed the induction motor 11 with predetermined A.C. power. For a complete elevator operating arrangement, a sheave, 13 a rope 14, a cage 15, and a counterweight 16 are also illustrated.

Here, the primary current command calculating circuit 23 of the control device 2 has an arrangement in FIG. 5. In the figure, symbols 23a, 23b and 23c denote multipliers, symbol 23d an adder, symbol 23e a sinusoidal wave generator which delivers cos $\theta$, sin $\theta$ and cos $(\theta - \frac{2}{3}\pi)$, sin $(\theta - \frac{2}{3}\pi)$ components on the basis of an output from the adder 23d, and symbol 23f a two-phase/three-phase converter which calculates and delivers the primary current commands $i_{uR}$, $i_{vR}$ and $i_{wR}$ on the basis of a torque component current command value $i_{qR}$, a magnetic flux component current command value $i_{dR}$ and the outputs of the sinusoidal wave generator 23e. These constituent elements perform calculations in accordance with the following equations:

Now, letting $\phi_{2R}$ denote a secondary flux command value ("R" is affixed to command values), the torque component current command value $i_{qR}$ is given by:

$$i_{qR} = \frac{L_2}{P M \phi_{2R}} \cdot T_R \tag{1}$$

$L_2$: secondary inductance of the motor,
M: mutual inductance of the motor,
P: number of pole pairs.

And the magnetic flux component current command value $i_{dR}$ is given by:

$$i_{dR} = \frac{1}{M} \phi_{2R} + \frac{1}{M} \frac{L_2}{R_2} \frac{d}{dt}(\phi_{2R}) \tag{2}$$

($R_2$: secondary resistance of the motor). As apparent from Eq. (2), a magnetic flux $\phi_2$ within the motor becomes:

$$\phi_2 = \frac{1}{1 + T_2 S} i_d \tag{3}$$

so that the secondary magnetic flux follows up a magnetic flux component current with a first-order lag.

In addition, a slip angular frequency command $\omega_{sR}$ becomes:

$$\omega_{sR} = \frac{R_2}{P \phi_{2R}^2} T_R \tag{4}$$

The primary current commands $i_{uR}$, $i_{vR}$ and $i_{wR}$ become:

$$i_{uR} = \sqrt{\tfrac{2}{3}} \{i_{dR} \cos \theta_O - i_{qR} \sin \theta_O\} \tag{5}$$

$$i_{vR} = \sqrt{\tfrac{2}{3}} \{i_{dR} \cos(\theta_O - \tfrac{2}{3}\pi) - i_{qR} \sin(\theta_O - \tfrac{2}{3}\pi)\} \tag{6}$$

$$i_{wR} = -(i_{uR} + i_{wR}) \tag{7}$$

where $$\theta_O = \int (P \omega_r + \omega_{sR}) dt \tag{8}$$

since a control of constant magnetic flux is usually adopted in the control of an elevator, $$\phi_{2R} = \text{constant} \tag{9}$$

with which Eq. (2) is reduced to:

$$i_{dR} = \frac{\phi_{2R}}{M} \text{ (constant)} \tag{10}$$

That is, the multiplier 23a calculates the torque component current command value $i_{qR}$ in accordance with Eq. (1), the multiplier 23b calculates the slip angular frequency command $\omega_{sR}$ in accordance with Eq. (4), and the two-phase/three-phase converter 23f calculate the primary currents $i_{uR}$, $i_{vR}$ and $i_{wR}$ in accordance with Eqs. (5)-(7) respectively.

As understood from Eq. (3), the actual secondary flux of the motor follows up the d-axis current $i_d$ of the motor with the first-order lag. In the circuit of FIG. 5 arranged so as to give $i_{dR}$ in the form of $\phi_{2R}/M$, therefore, the d-axis current is caused to flow before releasing a brake at the time of the start of movement of the elevator cage, for the purpose of establishing a field, whereupon when the field has reached a predetermined value, the brake is released so as to afford a desired linear torque, namely, in the form of $$T = \frac{P M \phi_2}{L_2} \cdot i_q = K \cdot i_q \text{ where } K \text{ is constant.} \tag{11}$$

(This is called "pre-excitation".) The period of time for rendering the field the predetermined value by causing the d-axis current to flow beforehand (pre-excitation period) is ordinarily required to be 200–400 msec, and it is desirable from the viewpoints of an operating efficiency that the period of time be as short as possible.

In some high-grade elevators, a balancer for compensating the unbalanced load of the elevator is disposed in the cage 15, and a torque for compensating the unbalanced load is produced at the time of the start, whereby even when the brake is released, the cage does not start abruptly due to the unbalanced load.

In elevators of low speed, however, such a device is not used, and the cage starts abruptly after releasing the brake at the time of the start, so that a starting shock prevents a comfortable ride.

SUMMARY OF THE INVENTION

The present invention has as its objective the elimination of the disadvantages described above, and has for its more specific object to provide a speed control apparatus according to which starting shock is minimized even in an elevator furnished with no balancer, and further, the pre-excitation period is shortened.

BRIEF DESCRIPTION OF THE DRAWINGS

FIGS. 1 to 3 illustrate an embodiment of the present invention, in which FIG. 1 is a diagram of a primary current command calculating circuit, FIG. 2 is a diagram of a field command circuit, and FIG. 3 is a characteristic diagram of a magnetic flux command value $\phi_{2R}$ according to the circuit of FIG. 2; and FIGS. 4 and 5 illustrate a prior-art speed control apparatus for an elevator, in which FIG. 4 is an arrangement diagram of the conventional speed control apparatus, while FIG. 5 is a diagram showing a prior-art example corresponding to the circuit of FIG. 1.

In the drawings, the same symbols indicate identical or corresponding portions.

PREFERRED EMBODIMENT OF THE INVENTION

Now, an embodiment of the present invention will be described with reference to FIGS. 1 to 3. It is noted that in this illustrated embodiment, magnetic flux command of a motor is intensified in only the starting mode of an elevator (from within a pre-excitation period), whereby:

(1) during the pre-excitation period, direct current is caused to flow through the motor to produce the magnetic flux command, and by intensifying this magnetic flux command, a D.C. braking effect is further reinforced, so that even when a brake is released, the movement of a cage attributed to an unbalanced load is suppressed to the utmost, and (2) further, owing to the magnetic flux command being intensified, a greater torque is generated as understood from Eq. (11), with the result that the response of the speed control system of the elevator is quickened, thereby to improve reduce the starting shock of the elevator.

Figure 1:
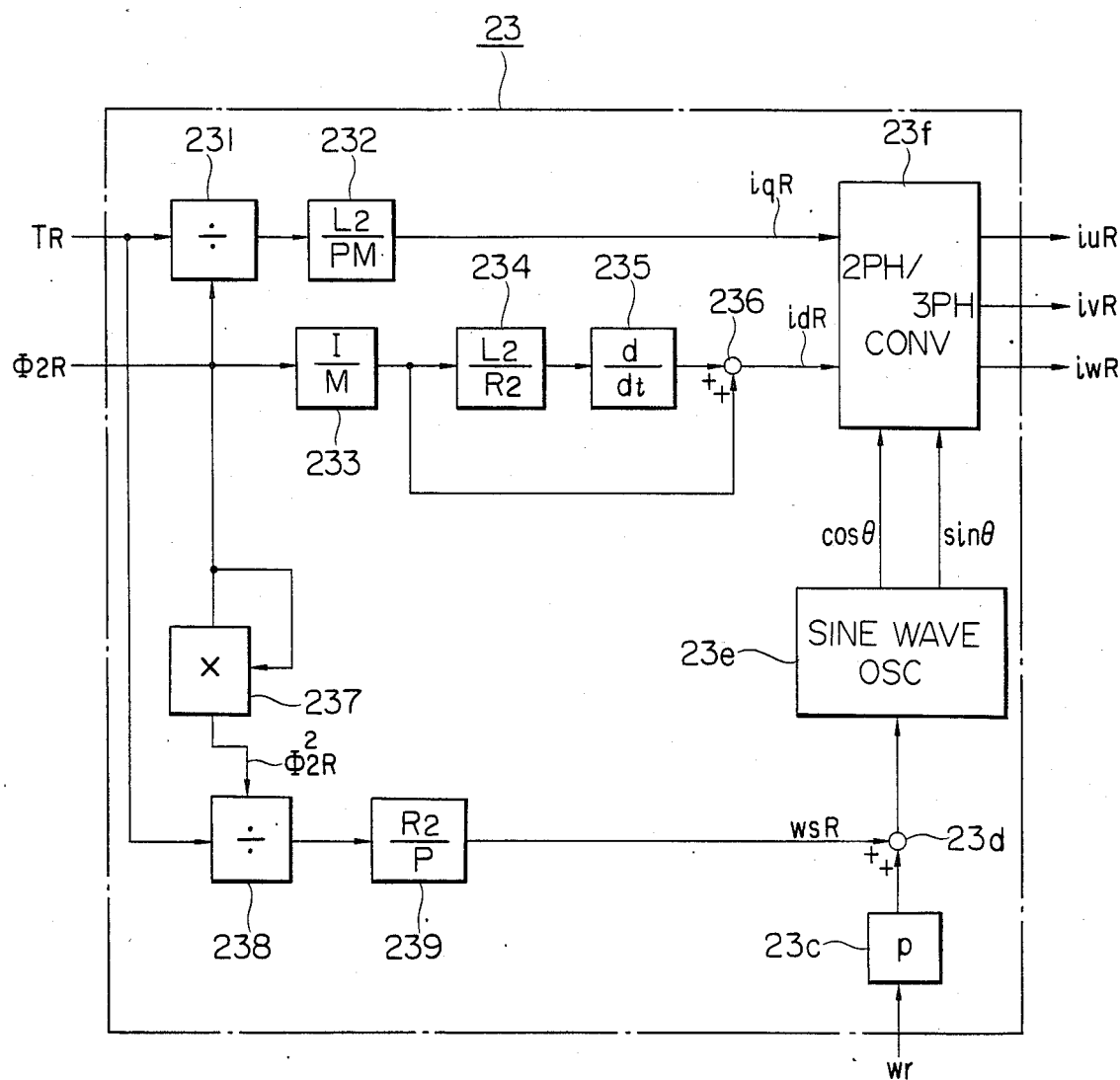

FIG. 1 shows a diagram of the primary current command calculating circuit according to the present invention. It is noted that like elements are assigned the same symbols, and numerals 231 and 238 indicate dividers, numerals 232–234, 237 and 239 multipliers, numeral 235 a differential circuit, and numeral 236 an adder.

Usually, the secondary magnetic flux $\phi_2$ becomes the first-order lag of the primary d-axis current $i_d$ within the motor. For this reason, in order to equalize the actual magnetic flux $\phi_2$ to the magnetic flux command $\phi_{2R}$ without any lag when this magnetic flux command $\phi_{2R}$ has been given, the d-axis current command to be given needs to be one including the differential term of $\phi_{2R}$ as in:

$$i_{dR} = \underbrace{\frac{1}{M} \phi_{2R}}_{\text{steady term}} + \underbrace{\frac{1}{M} \frac{L_2}{R_2} \frac{d}{dt} \phi_{2R}}_{\text{differential term}} \tag{2}$$

(that is, forcing must be done).

The arrangement of FIG. 1 is adapted to perform a magnetic flux variable control, and adopts the aforementioned equation (12) as the calculative equation of $i_{dR}$ in order that the magnetic flux command $\theta_{2R}$ and the actual flux $\theta_2$ of the motor may become equal. In this way, as already stated, the secondary magnetic flux $\theta_2$ of the motor follows up the secondary flux command $\theta_{2R}$ without an appreciable lag, and the pre-excitation period $t_p$ (in FIG. 3) can be shortened.

With the arrangement of FIG. 1, the differential term is contained in the d-axis current command, and hence, the flux variable control is possible. This arrangement, however, does not include a balancer. Therefore, before the brake is released, the motor is D.C.-excited by causing the D.C. excitation current to flow. Thus, even when the brake is released, the motor is difficult to rotate owing to the D.C. braking effect, and the starting shock lessens. This effect becomes more remarkable noticeable by further reinforcing the excitation of the motor. The intensified field is approximately double the field of the motor in the normal state, and even when a motor intensified field command is issued, the field is not intensified on account of the saturation of the iron core of the motor, etc. Here, the "Normal field" is a field on the basis of applying a rated voltage to the motor in the no-load state. The period of time of the intensified field may be approximately until the start of movement of the elevator cage. The reason is that, since the intensified field increases the magnetic noise of the motor, the continuation thereof for a long time is unfavorable.

Figure 4:
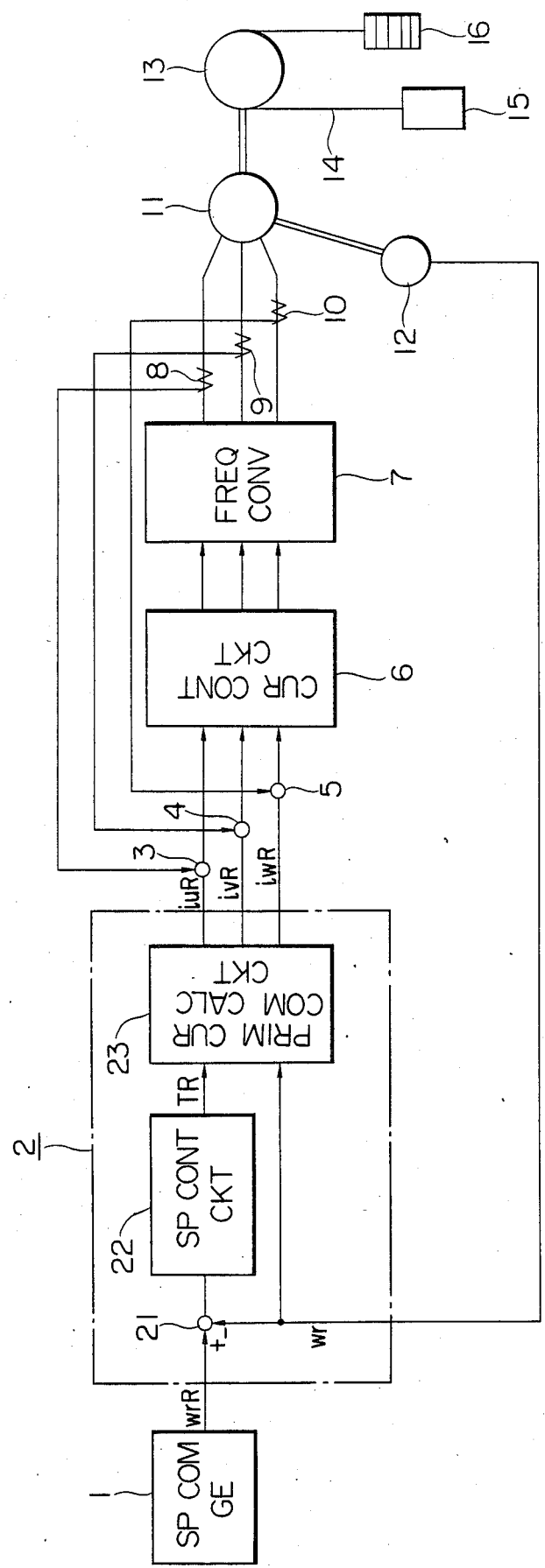
Figure 5:
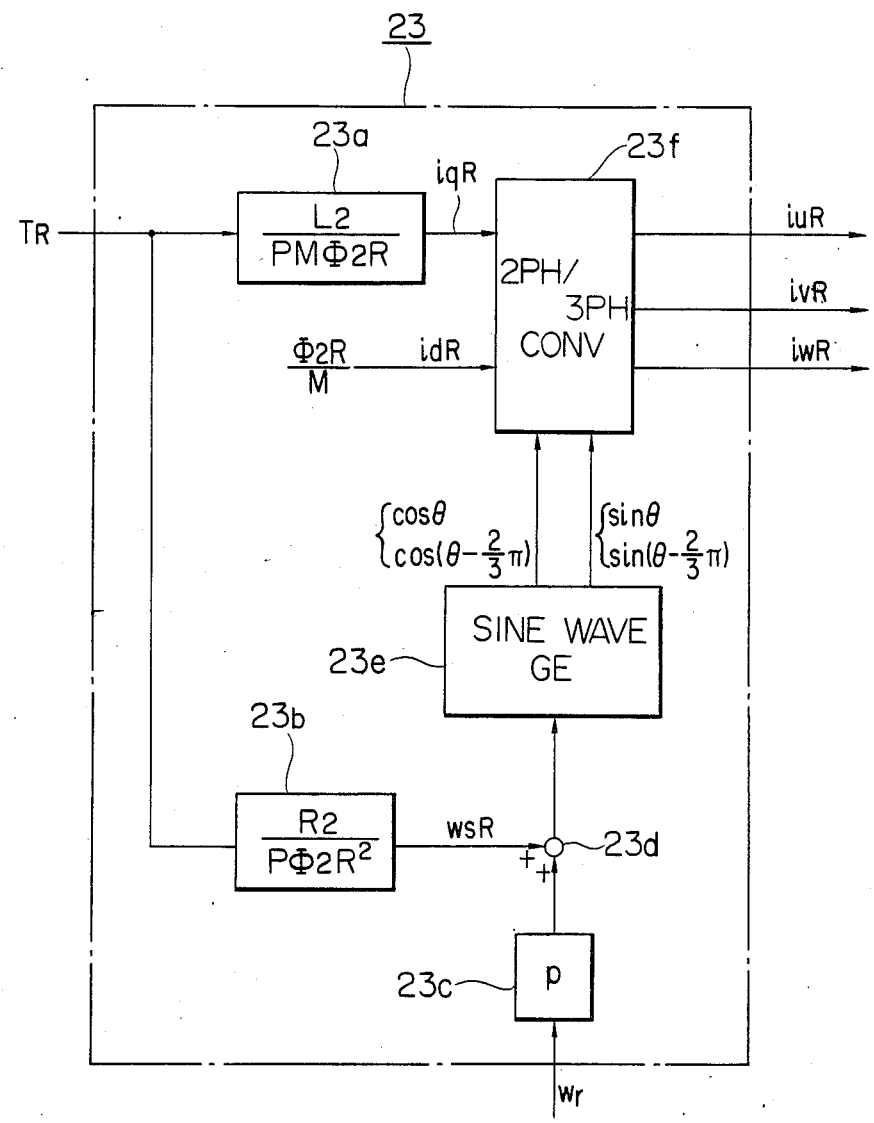

It is noted that the two phase/three phase converter 23f constitutes a converter means for determining primary current command $i_{uR}$, $i_{vR}$, and $i_{wR}$ on the basis of a torque component current command $i_{qR}$, which is derived from the torque command $t_{Rx}$ and a field component current command $i_{dR}$, which is derived from the magnetic flux command $\theta_{2R}$. The remaining elements of the primary current command calculating circuit 23 constitutes a portion of a generating means. This portion supplies the intensified and reduced field component current commands to the converter means to produce an intensified field of the induction motor before the time of start of movement of the cage and a reduced field of the induction motor after the time of start of movement of the cage so as to reduce starting shocks due to an unbalanced load in the cage. Furthermore, the primary current commands $i_{uR}$, $i_{vR}$, and $i_{wR}$ are then supplied to a circuit means constituting the current control circuit 6 and frequency converter 7 (as shown in FIG. 4) to derive primary currents for the induction motor.

Figure 2:
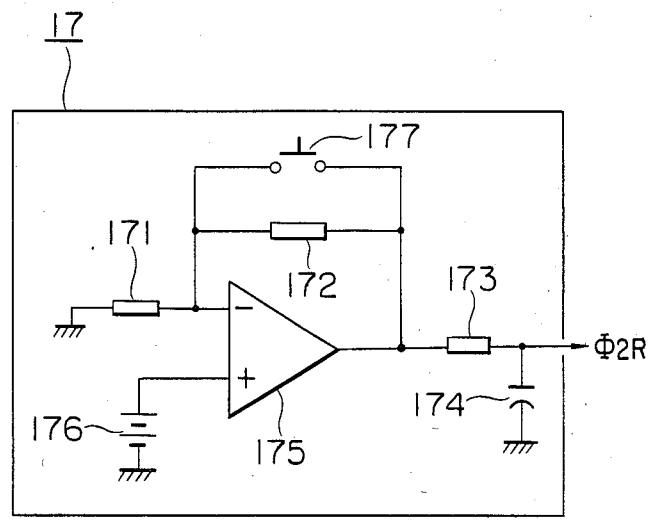

Next, another portion of the generating means is illustrated as a a field command circuit 17 and shown in FIG. 2. In the figure, numerals 171-173 denote resistors, numeral 174 a capacitor, numeral 175 an operational amplifier, numeral 176 a reference voltage source (voltage value $-V_{ref}$), and numeral 177 a switching means, herein shown as a switch, whose contact is opened until the speed of the cage reaches a certain value when the elevator is to stop or after it has started and whose contact is closed upon the arrival of the speed at the certain value until the elevator stops. This portion of the generating means controls the magnetic flux command value $\phi_{2R}$ in accordance with a characteristic diagram shown in FIG. 3.

Figure 3:
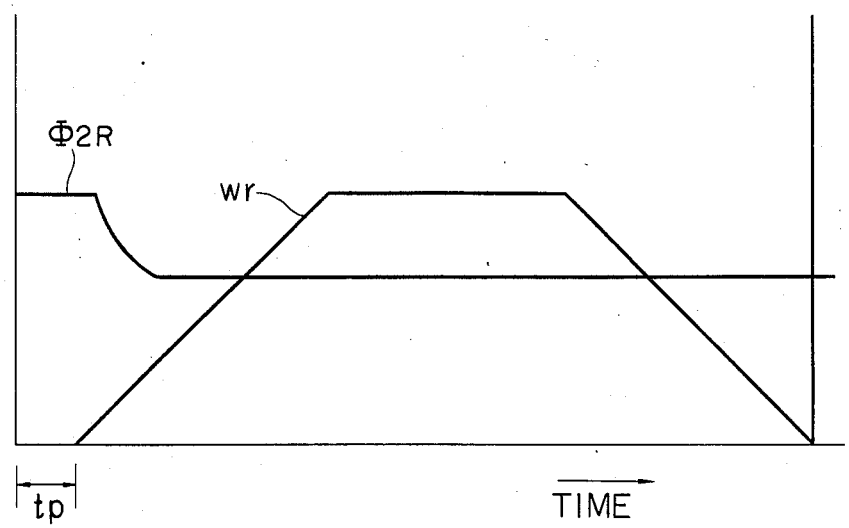

As clearly illustrated in FIG. 3, an intensified magnetic flux command $\theta_{2R}$ is generated before a time of start of movement of the cage (period $t_p$), and a reduced magnetic flux command $\theta_{2R}$ is generated after this period $t_p$ so that respective intensified and reduced field component current commands are corespondingly generated.

As set forth above, the present invention includes the aspects of intensifying the field of a motor beforehand at the time of the start of an elevator cage and reducing it down to a predetermined value after the start of the cage, whereby the start is improved.

I claim:

1. In a drive system for an elevator cage wherein D.C. is inverted into A.C. of variable voltage and variable frequency by a current control-type inverter including an induction motor for driving the cage having field windings supplied with VVVF A.C. primary currents producing a field of intensity determined by the primary currents, a speed control apparatus for said induction motor comprising:

converter means for determining primary current commands on the basis of a torque component current command derived from a torque command and a field component current command derived from a magnetic flux command, circuit means for deriving primary currents supplied to the induction motor based on the primary current commands, and means for generating an intensified field component current command before a time of start of movement of the cage and a reduced field component current command after the time of start of movement of the cage, and for supplying the intensified and reduced field component current commands to said converter means to produce an intensified field of the induction motor before the time of start of movement of the cage and a reduced field of the induction motor after the time of start of movement of the cage so as to reduce starting shocks due to an unbalanced load in the cage.

2. A speed control apparatus for an elevator according to claim 1 wherein said generating means generates a field component current command which varies according to time and is supplied to said converter means for determining primary current commands.

3. A speed control apparatus for an elevator according to claim 1 wherein the intensified field component current command which is generated by said generating means is a command which generates a field approximately double that in a normal operation.

4. A speed control apparatus for an elevator according to claim 3 wherein the intensified field component current command which is generated by said generating means decreases after the time of start of movement of the cage to a command which generates a field of a predetermined value for normal operation.

5. In a drive system for an elevator cage wherein D.C. is inverted into A.C. of variable voltage and variable frequency by a current control-type inverter including an induction motor for driving the cage having field windings supplied with VVVF A.C. primary currents producing a field of intensity determined by the primary currents, a speed control
apparatus comprising:
converter means for determining primary current commands on the basis of a torque component current command derived from a torque command and a field component current command derived from a magnetic flux command,
circuit means for deriving primary currents supplied to the induction motor based on the primary current commands, and
means for generating an intensified field component current command before the time of start of movement of the cage and a reduced field component current command after the time of start of movement of the cage, and for supplying the intensified and reduced field component current commands to said converter means to produce an intensified field of the induction motor before the time of start of movement of the cage and a reduced field of the induction motor after time of start of movement of the cage so as the reduce starting shocks due to an unbalanced load in the cage,
said generating means including a differential circuit for differentiating the magnetic flux command.

6. A speed control apparatus for an elevator according to claims 5 wherein said generating means further comprises multiplier units for multiplying the received magnetic flux command by predetermined coefficients and an adder, said differential circuit differentiating an output of said multiplier unit, and said adder summing an output of said differential circuit and the output of said multiplier unit.

7. A speed control apparatus for an elevator according to claim 5 wherein said generating means includes a command circuit
for generating a magnetic flux command of a higher output value until a speed of the cage reaches a predetermined value, and generating a magnetic flux command of a lower output value until the elevator stops after the speed has reached the predetermined value.

8. A speed control apparatus for an elevator according to claim 7 wherein said command circuit includes switching means, the open and closed states of which are changed-over between a period of time in which the cage speed reaches the predetermined value after it has started, and a period of time in which the elevator stops after the cage speed has reached the predetermined value.

9. A speed control apparatus for an elevator according to claim 7 wherein said command circuit decreases the magnetic flux command gradually from the higher output value to the lower output value.

* * * * *